United States Patent [19]
Easley

[11] Patent Number: 5,645,810
[45] Date of Patent: Jul. 8, 1997

[54] HIGH SURFACE AREA MEIXNERITE FROM HYDROTALCITES

[75] Inventor: Michael A. Easley, Arnold, Pa.

[73] Assignee: Aluminum Company of America, Pittsburgh, Pa.

[21] Appl. No.: 473,828

[22] Filed: Jun. 7, 1995

[51] Int. Cl.$^6$ ........................................... C01F 7/16
[52] U.S. Cl. ........................................... 423/600
[58] Field of Search ................................ 423/600

[56] References Cited

U.S. PATENT DOCUMENTS

| | | |
|---|---|---|
| Re. 34,164 | 1/1993 | Misra . |
| 4,649,037 | 3/1987 | Marsh et al. .................. 423/600 |
| 5,348,725 | 9/1994 | Misra et al. ................... 423/600 |
| 5,514,361 | 5/1996 | Martin et al. .................. 423/600 |

OTHER PUBLICATIONS

Shen, J. et al, "Synthesis and Surface Acid/Base Properties of Magnesium–Aluminum Mixed Oxides Obtained from Hydrotalcites", *Langmuir*, vol. 10, No. 10, 1994, pp. 3902–3908.

Mascolo, G. et al, "A New Synthesis and Characterization of Magnesium–Aluminum Hydroxides", *Mineralogical Magazine*, Mar. 1980, vol. 43, pp. 619–621.

Pausch, I. et al, "Syntheses of Disordered and Al–Rich Hydrotalcite–Like Compounds", *Clay and Clay Minerals*, vol. 34, No. 5, 1986, pp. 507–510.

Dimotakis, E. et al, "Communications", *Inorganic Chemistry*, vol. 29, No. 13, Jun. 27, 1990, pp. 2393–2394.

*Primary Examiner*—Wayne Langel
*Attorney, Agent, or Firm*—Tracey D. Beiriger

[57] ABSTRACT

A method for making a synthetic meixnerite which, when activated, has a high B.E.T. surface area, typically about 290 m$^2$/g or greater. The method comprises activating hydrotalcite, then cooling and hydrating such activated material in a carbon dioxide-free environment. Such hydration can produce a material that absorbs more than 100% of its weight in water. Following hydration, this material is activated a second time in a virtually carbon dioxide-free environment.

17 Claims, 5 Drawing Sheets

HIGH SURFACE AREA MEIXNERITE FROM HYDROTALCITES

BACKGROUND OF THE INVENTION

1. Field of the Invention

This invention relates to the field of making mixed metal hydroxides or layered double hydroxide compounds. More specifically, the invention relates to a high surface area synthetic meixnerite product and method for making the same.

2. Technology Review

Naturally occurring meixnerite exists as a secondary mineral in the cracks of serpentine rocks near Ybbs, Persenberg in lower Austria. In its crystalline state, such meixnerite material is tabular, colorless and has perfect basal cleavage. Natural meixnerite is closely related to hydrotalcite and pyroaurite in overall structure. It has an infrared absorption spectrum that compares favorably with those for hydrotalcite and other synthetic magnesium-aluminum double hydroxides. Hydrotalcite ideally has the formula $Mg_6Al_2(OH)_{16}CO_3 \cdot 4H_2O$. Synthetic hydrotalcites generally have the formula $[Mg_{1-x}Al_x(OH)_2]x+(CO3^{n-}{}_{x/n}) \cdot m\ H_2O$ where x may very over a range of approximately 0.1 to 0.35 corresponding to magnesium to aluminum ratios as high as 9 and as low as 1.9. Others in the literature have claimed to synthesize hydrotalcites with magnesium to aluminum ratios as high as 12 (see Shen et at, "Synthesis and Surface Acid/Base Properties of Magnesium-Aluminum Mixed Oxides Obtained From Hydrotalcites", Langmuir, Vol. 10, 1994). In some circles, meixnerite is even listed among other hydrotalcite-like materials, or grouped in the broader family of "hydrotalcites". Under the latter definition, meixnerite is a carbonate-free member of the hydrotalcite family which has only hydroxy anions. Still others refer to meixnerite as an all hydroxyl, layered double hydroxide.

Meixnerite, or magnesium aluminum hydroxide hydrate, is often symbolized by the formula $Mg_6Al_2(OH)_{18} \cdot 4H_2O$, although still other formulaic representations include: $Mg_4Al_2(OH)_{14} \cdot 3H_2O$ and $[Mg_3Al(OH)_8]OH \cdot 2H_2O$. Hydrotalcite and meixnerite share the same general X-ray diffraction pattern.

The synthesis of meixnerite is fairly new and the following various methods of manufacture do not appear to be commonly practiced or commercially practical. In March 1980, G. Mascolo et al described a synthesis process in *Mineralogical Magazine* whereby magnesium oxide, decomposed from basic magnesium carbonate at 650° C. for 6 hours, was combined with an alumina gel and rotated in an air thermostated oven for one week at 80° C. The resulting product was then dried over silica gel. It was analyzed to contain some brucite compound and about 0.8–1.0 wt. % carbon dioxide.

Six years later, I. Pausch et al wrote of a variation on the aforementioned process in *Clay and Clay Minerals*. Therein, magnesium oxide, annealed at 1050° C., was combined with an alumina gel ($\delta$-$Al_2O_3$), $MgC_2O_4 \cdot 2H_2O$ and distilled water. This combination was heated to between 100°–350° C. at a pressure of 100 MPa for various reaction times ranging from 7 to 42 days. IR spectroscopy analysis of the resulting product showed some carbonate contamination, but at an intensity of less than 5% as compared to natural hydrotalcite.

From a series of experiments reported by E. Dimotakis et al in *Inorganic Chemistry*, Vol. 29, No. 13 (1990), synthetic meixnerite was prepared by calcining a hydrotalcite of the formula $[Mg_3Al(OH)_8][CO_3]_{0.5} \cdot 2H_2O$ at 500° C. to form a metal oxide solution. This oxide was then hydrolyzed at 25° C. in a carbon dioxide-free environment.

It is a principal objective of this invention to provide a means for making a synthetic meixnerite which, when activated, has a B.E.T. surface area of about 290 $m^2/g$ or greater. It is another objective to make a synthetic meixnerite that consists of a double layered hydroxide with 100% or more of its weight in water. It is still another objective to make a high surface area synthetic meixnerite that when activated may be capable of catalyzing chemical reactions with or without supported metals. It is another objective to provide a method for making a synthetic meixnerite capable of adsorbing gases like $CO_2$. It is still another objective to provide a process for synthesizing meixnerite and related minerals from two different hydrotalcites. It is still another objective to create a hydrotalcite-like compound having significantly lower carbonate levels and virtually no other anion contamination. It is still another objective to provide a method for making high surface area synthetic meixnerite which is not dependent on the use of alumina gels.

On a preferred basis, synthetic meixnerite can be made from fairly inexpensive and readily available reactants by this process, thus making it suitable for the commercial scale production.

SUMMARY OF THE INVENTION

In accordance with the foregoing objectives, there is provided a method for making a synthetic meixnerite which, when activated, has a high surface area. The method comprises activating hydrotalcite, then cooling and hydrating such activated material in a carbon dioxide-free environment. Such hydration can produce a material that absorbs more than 100% of its weight in water. Following hydration, this material is activated a second time in a virtually carbon dioxide-free environment. This second activation creates an activated meixnerite product (mixed metal oxide) with a B.E.T. surface area of about 290 $m^2/g$ or greater.

DETAILED DESCRIPTION OF PREFERRED EMBODIMENTS

Figure 1:
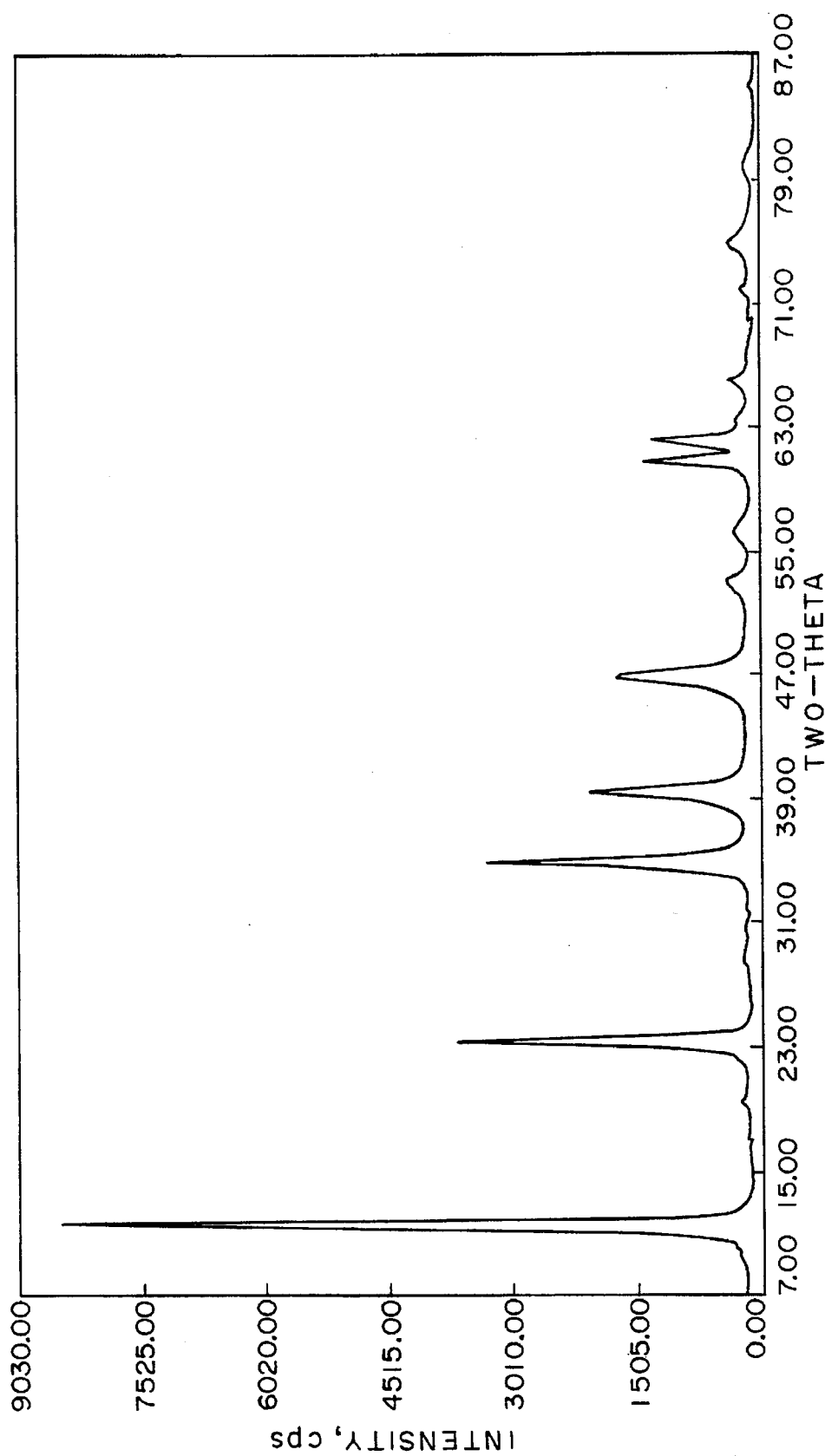
FIG. 1 is the X-ray diffraction pattern of the meixnerite of Example 1 made from hydrotalcite A, activated to 600° C. and using vapor hydration.

Meixnerite of the present invention is synthesized from a metal hydroxide compound or a layered double hydroxide compound. More specifically, the meixnerite is a mixed magnesium-aluminum oxide prepared from one or more hydrotalcite compounds. A preferred way of comparing such materials uses the Brunauer-Emmett-Teller (or B.E.T.) surface area measurement method. This invention provides an activated synthetic meixnerite having a B.E.T. surface area of about 290 m²/g or greater.

Typical activation of a hydrotalcite material between about 500° to 1000° C. produces a material with a B.E.T. surface area in the range of about 140 to 230 m²/g. The following table lists actual B.E.T. surface area measurements of one of the hydrotalcites used in the examples of this invention.

TABLE 1

Hydrotalcite A Activation Surface Areas

| Activation Temperature (°C.) | B.E.T. Surface Area (m²/g) |
|---|---|
| 100 | 26 |
| 150 | 24 |
| 200 | 25.5 |
| 300 | 30.5 |
| 400 | 83 |
| 425 | 134 |
| 450 | 139.5 |
| 500 | 178 |
| 550 | 213.5 |
| 600 | 210.5 |
| 650 | 220.5 |
| 700 | 226.5 |
| 800 | 231.5 |
| 900 | 202.5 |
| 1000 | 140 |

The method of this invention includes first activating the hydrotalcite to about 600° C. and then hydrating the activated material in a substantially carbon dioxide-free environment. The resulting material is then activated at one or more temperatures between about 500° and 850° C. in a substantially carbon dioxide-free environment to produce a mixed metal oxide having a surface area that exceeds about 290 m²/g.

During the first step of hydrotalcite activation, most of the physi-sorbed and chemi-sorbed water and carbon dioxide from the hydrotalcite structure are desorbed or removed. This reaction preferably proceeds at one or more temperatures between about 500° and 850° C. When this activated material is hydrated in a substantially carbon dioxide-free environment, the reaction which is believed to take place may be summarized by the following formula:

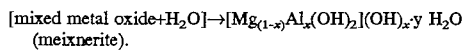

[mixed metal oxide+$H_2O$]→[$Mg_{(1-x)}Al_x(OH)_2$](OH)$_x$·y $H_2O$
(meixnerite).

Following hydration, the resulting meixnerite is activated to yield a high surface area mixed metal oxide, that is, an activated meixnerite.

Experiments were conducted using two representative hydrotalcites; namely, hydrotalcites A and B for starting material when processed by the preferred hydration mechanisms summarized above. Both materials were synthesized by Alcoa. Hydrotalcite A, as manufactured by the process set forth in U.S. Pat. No. Re. 34,164, the disclosure of which is fully incorporated by reference herein, has an Mg/Al molar ratio of 2.0. Hydrotalcite B, as manufactured by the process set forth in U.S. application Ser. No. 290,220, the disclosure of which is fully incorporated herein by reference, has an Mg/Al molar ratio of 1.9. Both of these hydrotalcites resulted in a meixnerite-based end product with a B.E.T. surface area greater than 300 m²/g. Other hydrotalcites may also be suitable as a base material.

At elevated temperatures, these high surface area meixnerites should have excellent catalytic activity because of the large surface area. Such properties make the products of this invention suitable for many end uses. For example, these meixnerites may be used as $CO_2$ gas adsorbents or for catalytic reactions.

EXAMPLES

The hydrotalcites for the following examples were activated by heating. Various hydration methods were also employed using both vapor and liquid mediums for the substantially carbon dioxide-free environments employed herein.

For comparison purposes, Examples 1 through 6 were conducted using alternate base materials as well as varying hydration mediums. As demonstrated in the experiments reported by E. Dimotakis et al in *Inorganic Chemistry*, Vol. 29, No. 13 (1990), when using a liquid hydralion medium, the material prior to hydration had a solid weight ratio of 2%. However, it is expected that other weight ratio percentages will also work in accordance with this invention.

EXAMPLE 1

Hydrotalcite A was activated to about 600° C. Activation was performed in air in a Fisher Scientific ashing furnace with a ramp rate of 10° C./minute. After reaching a temperature of 600° C., the material was held for one additional hour at 600° C. The activated material was then cooled to room temperature in a substantially carbon dioxide-free environment. Once cooled, the material was hydrated in a vapor phase environment that was also substantially carbon dioxide-free. This was accomplished by placing cooled activated hydrotalcite in a closed, carbon dioxide-free vessel filled with a nitrogen or argon gas saturated with water vapor. This resulted in a flowable meixnerite material. The XRD pattern of the resulting material is shown in FIG. 1. On an activated weight basis, this meixnerite material readsorbed approximately up to 120% of its original weight in water.

Figure 2:
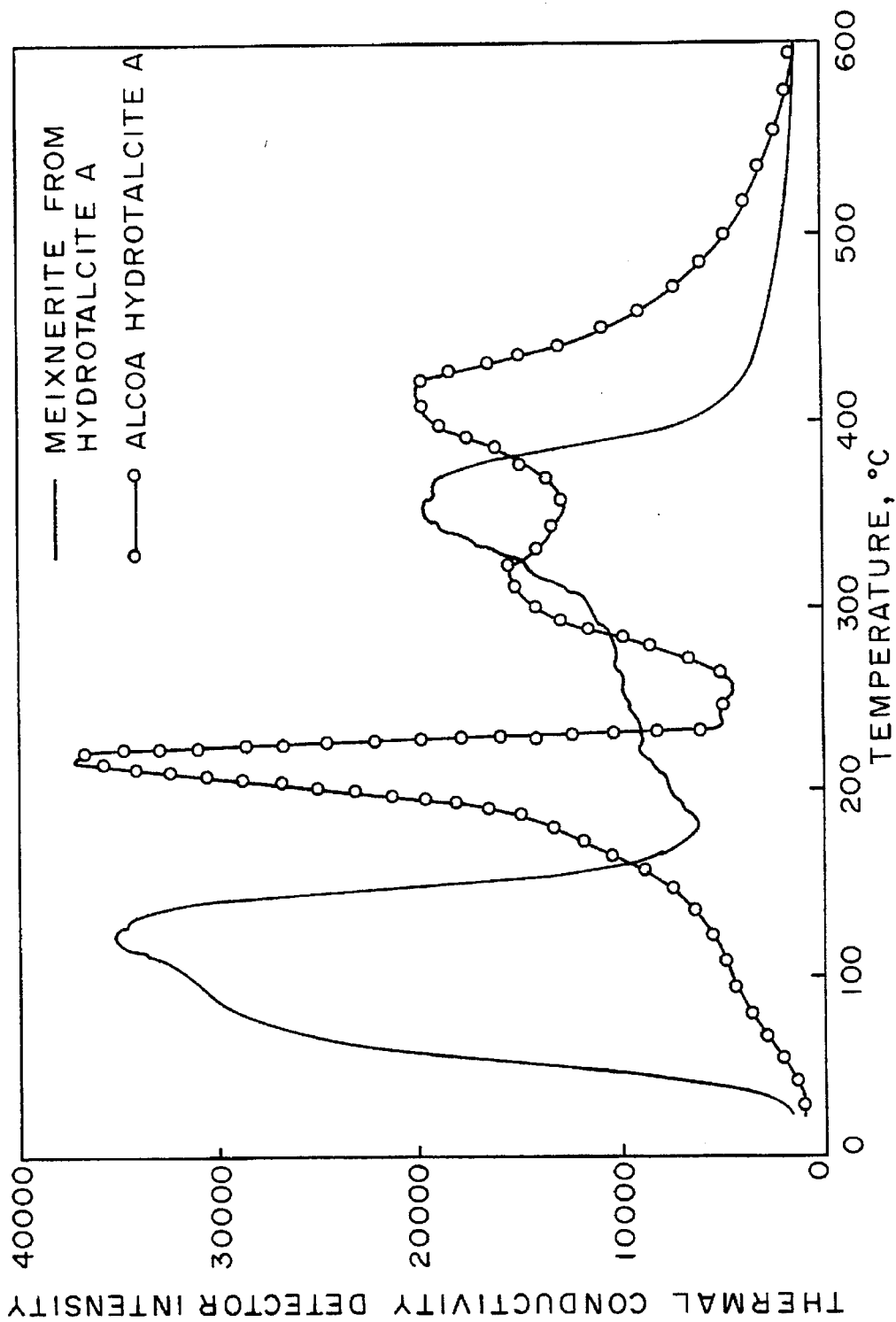
FIG. 2 is a graph showing the temperature at which the hydrotalcite and resulting meixnerite of FIG. 1 dehydrates.

Following hydration, the meixnerite material was activated to a temperature of 600° C. and held there for 10 minutes using an Altamira Instruments AMI-1 ("AMI-1"). In this device, the activated sample is not exposed to air between activation and taking of surface area measurements. FIG. 2 shows a temperature programmed reaction (TPR) scan done on the AMI-1 using a 10° C./min ramp rate. From this scan, the significant difference between hydrated original hydrotalcite and meixnerite can be seen. Specifically, the meixnerite gives up water at a substantially lower temperature than the hydrotalcite. The activated meixnerite's B.E.T. surface area was measured after cooling to be 334 m²/g using the AMI-1. Experiments were performed varying the time of vapor hydration. The surface area was also measured on three of the samples. Results are presented in Table 2.

TABLE 2

| | Vapor Rehydration Data | | | |
|---|---|---|---|---|
| Activated Hydrotalcite Used | Rehydration Length (hrs.) | % Water Pickup Act. Wt. Basis | % Chemisorbed Water Act. Wt. Basis | Post 600° C. Surface Area |
| A | 2 | 17 | 11 | |
| A | 8 | 25.5 | 18 | 274 |
| A | 24 | 43 | 30 | |
| A | 50 | 53 | 41 | |
| A | 100 | 64 | 63 | 293 |

TABLE 2-continued

| | Vapor Rehydration Data | | | |
|---|---|---|---|---|
| Activated Hydrotalcite Used | Re-hydration Length (hrs.) | % Water Pickup Act. Wt. Basis | % Chemisorbed Water Act. Wt. Basis | Post 600° C. Surface Area |
| A | 200 | 76.5 | 58.5 | |
| A | 300 | 93 | 66 | |
| A | 600 | 124 | 75 | 335 |

EXAMPLE 2

Figure 3:
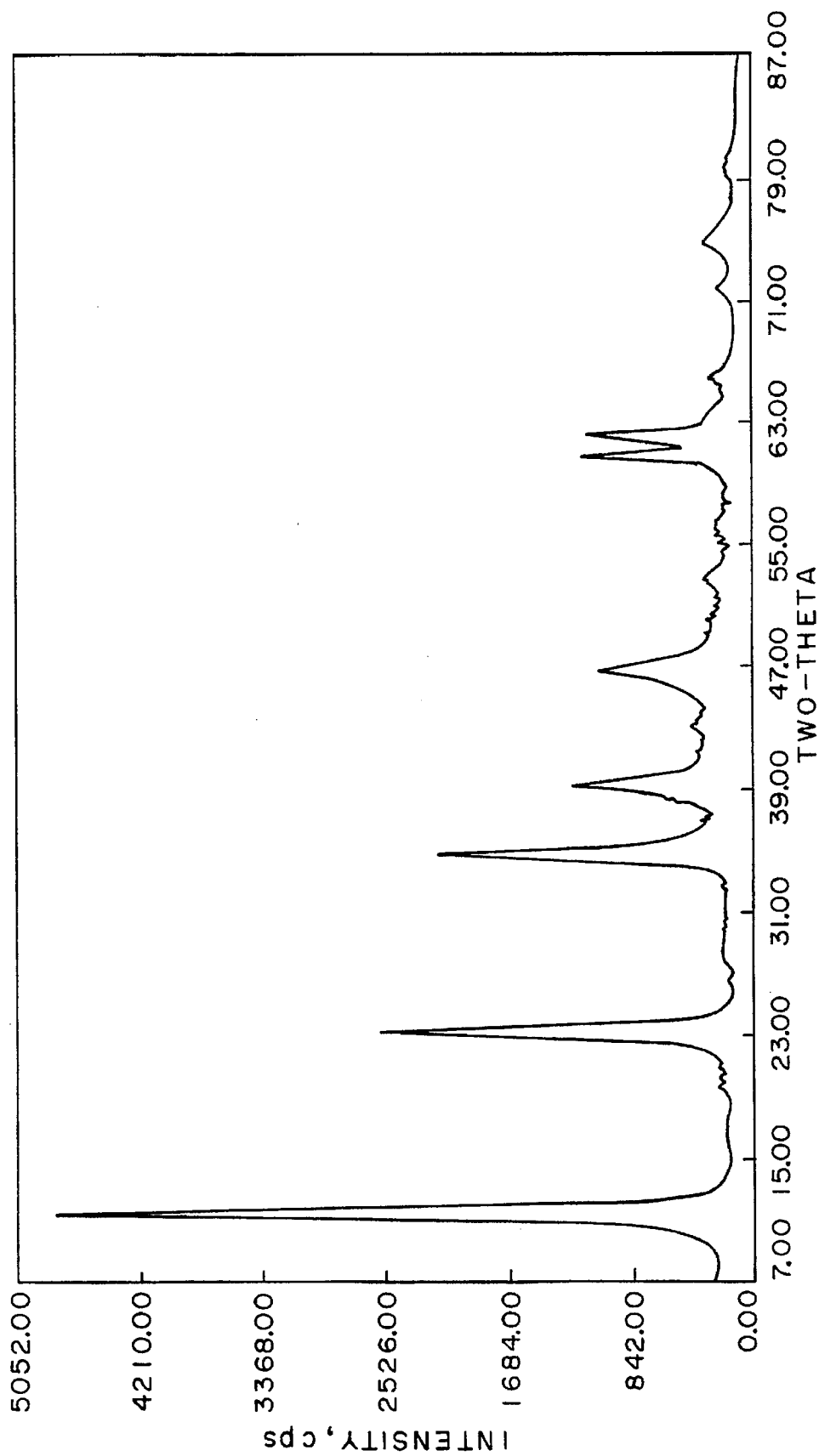
FIG. 3 is the X-ray diffraction pattern of the meixnerite of Example 2 made from hydrotalcite A, activated to 600° C. and using liquid hydration.

For this variation on Example 1, a substantially carbon dioxide-free, liquid phase environment was used for hydrating the activated material produced in accordance with the procedure described above. This liquid phase hydration involves plunging ° C activated hydrotalcite material into a container of double deionized water which is treated deionized water that is virtually carbon dioxide-free. The hydralion was allowed to continue for 16 hours after which time the sample was filtered and dried by evaporation in a substantially carbon dioxide-free environment. The XRD pattern of the resultant meixnerite is shown in FIG. 3. The meixnerite was activated to 600° C. and held for 10 minutes, cooled on the AMI-1 without exposure to $CO_2$, after which its surface area was measured. The resulting activated meixnerite had a measured B.E.T. surface area of 344 $m^2/g$.

EXAMPLE 3

Figure 4:
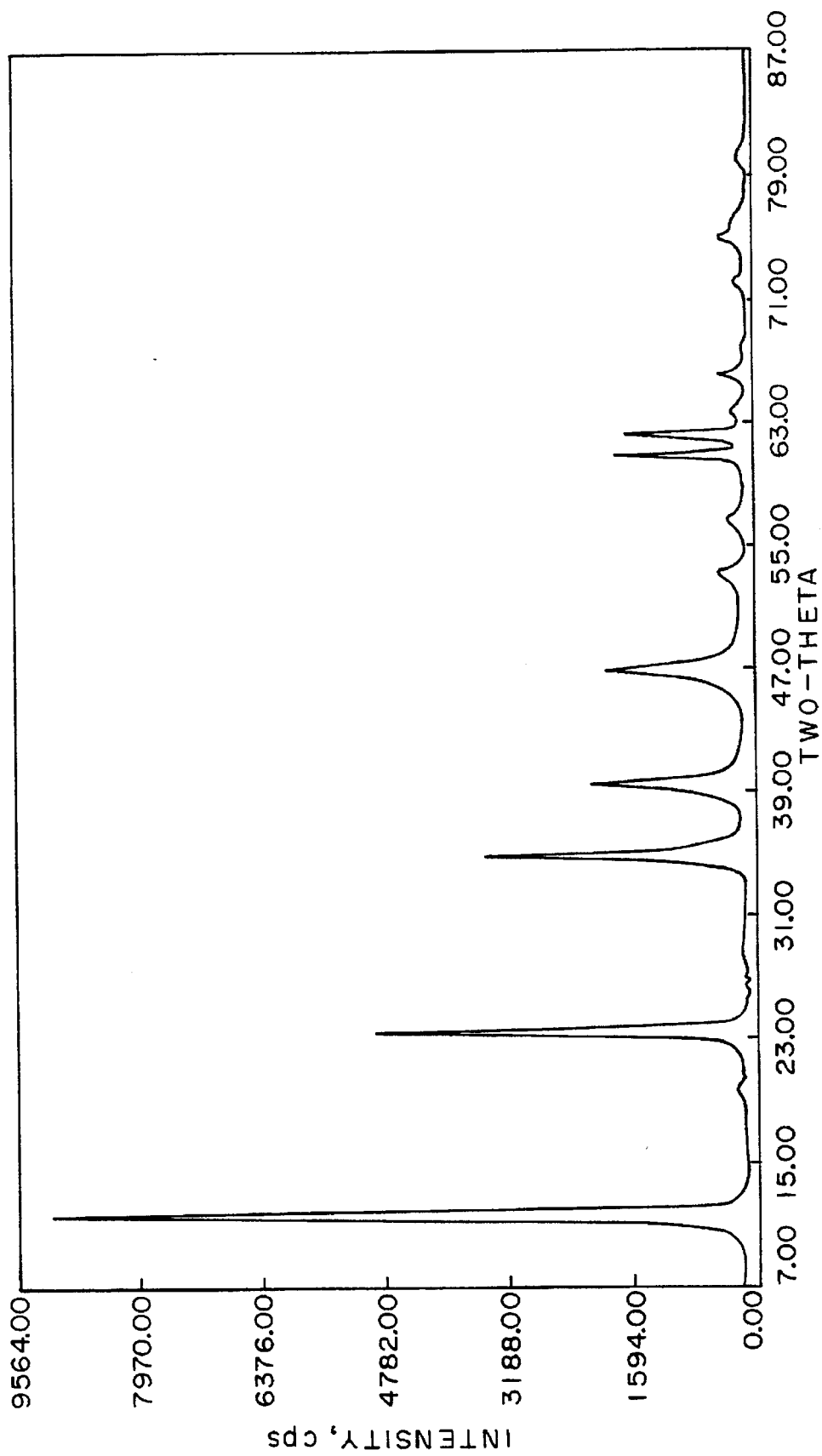
FIG. 4 is the X-ray diffraction pattern of the meixnerite of Example 3 made from hydrotalcite B, activated to 600° C. and using vapor hydration.

The experiment of Example 1 was repeated using hydrotalcite B as a base material rather than hydrotalcite A. The XRD of the resulting meixnerite is shown in FIG. 4. The activated meixnerite had a measured B.E.T. surface area of 341 $m^2/g$.

EXAMPLE 4

Figure 5:
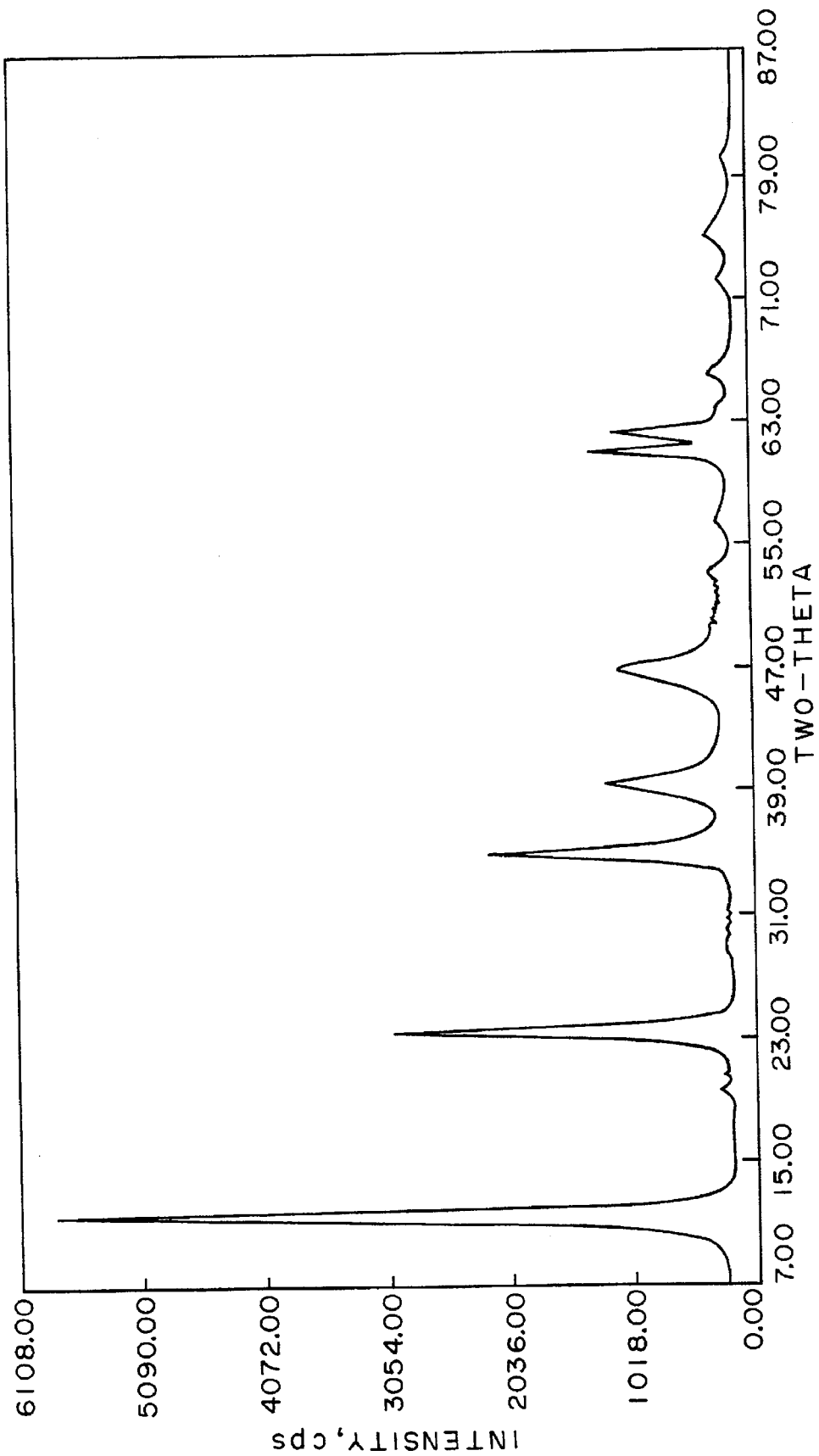
FIG. 5 is the X-ray diffraction pattern of the meixnerite of Example 4 made from hydrotalcite B, activated to 600° C. and using liquid hydration.

For this variation on Example 3, a substantially carbon dioxide-free, liquid phase environment was used for hydration of the activated material. Liquid phase hydration involves plunging the cooled activated hydrotalcite material into a container of double deionized water. The hydration process was performed for 16 hours after which time the sample was filtered and allowed to dry at room temperature in an evaporating dish in a substantially carbon dioxide-free environment. The XRD pattern of the meixnerite is shown in FIG. 5. The meixnerite was activated to 600° C. and had its surface area measured after cooling on the AMI-1. The B.E.T. surface area of the resulting material was measured at 349 $m^2/g$.

EXAMPLE 5

The meixnerite of Example 4 was activated to 800° C. rather than 600° C. The resulting meixnerite had a measured B.E.T. surface area of 333 $m^2/g$.

EXAMPLE 6

The same experiment as that conducted in Example 5 was rerun except that the meixnerite material was held for 120 minutes rather than 10 minutes at an activation temperature of about 800° C. Even with such a drastic increase in activation soak hold time, there was very little effect observed on the final B.E.T. surface area of the activated meixnerite, which was measured at 319 $m^2/g$.

Examples 1 through 6 are summarized in the following Table 3.

TABLE 3

| | | | | | | Normal |
|---|---|---|---|---|---|---|
| Example | Hydrotalcite Used | Hydration Method | Activation Temp. (°C.) | Activation Soak Hold (min.) | B.E.T. Surface Area ($m^2/g$) | Hydrotalcite SA After Activation |
| 1 | A | Vapor | 600 | 10 | 334 | 211 |
| 2 | A | Liquid | 600 | 10 | 344 | 211 |
| 3 | B | Vapor | 600 | 10 | 341 | 190–210 |
| 4 | B | Liquid | 600 | 10 | 349 | 190–210 |
| 5 | B | Liquid | 800 | 10 | 333 | |
| 6 | B | Liquid | 800 | 120 | 319 | |

EXAMPLE 7

Hydrotalcite B was activated to 600° C. for 60 minutes. The activated material was then cooled to a room temperature in a substantially carbon dioxide-free environment. Once cooled, the material was hydrated in a substantially carbon dioxide-free glycerol solution for 16 hours. As in the Dimotakis et al experiments, two volumes of glycerol were added to the carbon dioxide-free double deionized water directly before hydration commenced. Following hydration, the resulting material was filtered to remove excess water, then dried to a powder at room temperature in a evaporating dish using a substantially carbon dioxide-free environment. The material was then reactivated to 600° C. within the AMI-1 machine. The resulting activated material had a B.E.T. surface area measured at 288 $m^2/g$. Thus, it appears that using a glycerol solution as the medium for hydration negatively affects the B.E.T. surface area of the resulting material.

EXAMPLE 8

Four samples utilizing hydrotalcite B were packed in beds and analyzed with the AMI-1. Pure helium flow was replaced with a 5000 ppm $CO_2$ in helium certified gas blend. Carbon dioxide adsorption amounts were then determined. All four samples totally adsorbed the 5000 ppm of $CO_2$ initially. Adsorption results are tabulated in the following Table 4. The first sample was original hydrotalcite B. The second sample was hydrotalcite B tested after a 600° C. activation. The third sample was a meixnerite sample prepared according to the method described in Example 4 without activating the meixnerite. The fourth sample was prepared according to the method described in Example 4 including the 600° C. activation of the meixnerite before $CO_2$ adsorption was commenced. The last column of Table 4 shows that the unactivated meixnerite picked up significantly more $CO_2$ than the other three samples. However, the activated meixnerite also picked up significantly more $CO_2$ than either the unactivated or activated hydrotalcite. It should be noted that while the invention picked up $CO_2$ from a fluid consisting essentially of a helium gas stream in the aforementioned example, it is expected that $CO_2$ removal from liquid streams or solutions would also be accomplished hereby.

TABLE 4

$CO_2$ Adsorption Data

| Material | Charge Wt. (gms) | Post Activation Wt. (gms) | $CO_2$ Adsorbed (ml) | $CO_2$ Pickup Activated Wt. (ml/g) |
|---|---|---|---|---|
| Hydrotalcite B | 0.4752 | 0.2509 | 0.5304 | 2.113 |
| Hydrotalcite B Activated to 600° C. | 0.4803 | 0.2757 | 1.379 | 5.001 |
| Meixnerite from Hydrotalcite B | 0.4826 | 0.286 | 4.2432 | 14.84 |
| Meixnerite from Hydrotalcite B Activated to 600° C. | 0.4992 | 0.2836 | 2.1236 | 7.841 |

Having described the presently preferred embodiments, it is to be understood that the invention may be otherwise embodied within the scope of the appended claims.

What is claimed is:

1. A synthetic activated meixnerite having a B.E.T. surface area of about 290 m²/g or greater made from a process consisting of:

(a) activating a magnesium aluminum hydroxycarbonate hydrotalcite material;

(b) hydrating said activated material in a substantially carbon dioxide-free environment; and (c) reactivating said hydrated material at one or more temperatures between about 500° and 850° C. in a substantially carbon dioxide-free environment.

2. The synthetic activated meixnerite of claim 1, wherein said meixnerite can hold greater than 100% of its weight in water.

3. The synthetic activated meixnerite of claim 1, wherein said meixnerite is capable of adsorbing $CO_2$ from a fluid.

4. The synthetic activated meixnerite of claim 3 wherein the fluid is a gas.

5. The synthetic activated meixnerite of claim 3 wherein the fluid is a liquid.

6. The synthetic activated meixnerite of claim 1 wherein process step (a) occurs at one or more temperatures between about 500° and 850° C.

7. The synthetic activated meixnerite of claim 1 wherein process step (b) takes place in a gas environment saturated with water vapor.

8. The synthetic activated meixnerite of claim 7 wherein the gas environment consists essentially of nitrogen, helium, argon or combinations thereof.

9. The synthetic activated meixnerite of claim 1 wherein process step (b) occurs in a liquid environment.

10. The synthetic activated meixnerite of claim 1 wherein process step (b) includes placing the material of step (a) in a deionized $H_2O$ solution.

11. A method for making an activated meixnerite comprising:

(a) activating a magnesium aluminum hydroxycarbonate hydrotalcite material;

(b) cooling said activated material in a substantially carbon dioxide-free environment;

(c) hydrating said material in a substantially carbon dioxide-free environment;

(d) reactivating said hydrated material at one or more temperatures between about 500° and 850° C. in a substantially carbon dioxide-free environment; and (e) cooling said reactivated material in a substantially carbon dioxide-free environment.

12. The method of claim 11 wherein activating in step (a) occurs at one or more temperatures between about 500° and 850° C.

13. The method of claim 11 wherein said activated meixnerite is capable of adsorbing up to 120% of its weight in water.

14. The method of claim 11 wherein hydrating step (c) takes place in a gas environment saturated with water vapor.

15. The method of claim 14 wherein the gas environment consists essentially of nitrogen, helium, argon or combinations thereof.

16. The method of claim 11 wherein hydrating step (c) occurs in a liquid environment.

17. The method of claim 16 wherein hydrating step (c) includes placing the material of step (b) in a deionized $H_2O$ solution.

* * * * *